(12) United States Patent
Misawa et al.

(10) Patent No.: US 10,339,843 B2
(45) Date of Patent: Jul. 2, 2019

(54) DISPLAY DEVICE, DISPLAY IMAGE PROJECTING METHOD AND HEAD UP DISPLAY

(71) Applicant: MAXELL, LTD., Kyoto (JP)

(72) Inventors: Akio Misawa, Kyoto (JP); Yuki Nagano, Kyoto (JP); Yuji Fujita, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/764,179

(22) PCT Filed: Sep. 30, 2015

(86) PCT No.: PCT/JP2015/077689
§ 371 (c)(1),
(2) Date: Mar. 28, 2018

(87) PCT Pub. No.: WO2017/056217
PCT Pub. Date: Apr. 6, 2017

(65) Prior Publication Data
US 2018/0277027 A1    Sep. 27, 2018

(51) Int. Cl.
*G06F 3/01* (2006.01)
*G02B 27/01* (2006.01)
(Continued)

(52) U.S. Cl.
CPC .............. *G09G 3/001* (2013.01); *B60K 35/00* (2013.01); *G02B 27/01* (2013.01); *G06F 3/013* (2013.01);
(Continued)

(58) Field of Classification Search
CPC .................. G09G 3/001; B60K 35/00; B60K 2350/1072; G02B 27/01; G02B 27/0101; G02B 2027/0121; G06F 3/013
See application file for complete search history.

(56) References Cited

U.S. PATENT DOCUMENTS

2009/0231720 A1* 9/2009 Chengalva ......... G02B 27/0101
359/630

FOREIGN PATENT DOCUMENTS

| JP | H05-330363 A | 12/1993 |
| JP | 2012-083534 A | 4/2012 |

(Continued)

OTHER PUBLICATIONS

International Search Report for WO 2017/056217 A1, dated Dec. 8, 2015.

*Primary Examiner* — Robert J Michaud
(74) *Attorney, Agent, or Firm* — Volpe and Koenig, P.C.

(57) ABSTRACT

A display device configured to project a display image including at least any one of a first image or a second image is provided. A horizontal direction of the first image is longer than a vertical direction thereof. A vertical direction of the second image is longer than a horizontal direction thereof. The display device includes: a controller configured to generate a display image obtained by changing a width of at least any one of the first image or the second image in accordance with a deviation amount between the display image and a ghost image, the ghost image being visually recognized so as to deviate in a deviation direction with respect to the display image; and an image display configured to emit display light for projecting the display image generated by the controller.

8 Claims, 14 Drawing Sheets

(51) Int. Cl.
*G09G 3/00* (2006.01)
*B60K 35/00* (2006.01)

(52) U.S. Cl.
CPC ............... *B60K 2350/1072* (2013.01); *B60K 2350/2052* (2013.01); *B60K 2350/352* (2013.01); *G02B 27/0101* (2013.01); *G02B 2027/0121* (2013.01)

(56) References Cited

FOREIGN PATENT DOCUMENTS

| | | | |
|---|---|---|---|
| JP | 2015-102695 A | 6/2015 | |
| JP | 2015-166230 A | 9/2015 | |

\* cited by examiner

FIG. 3
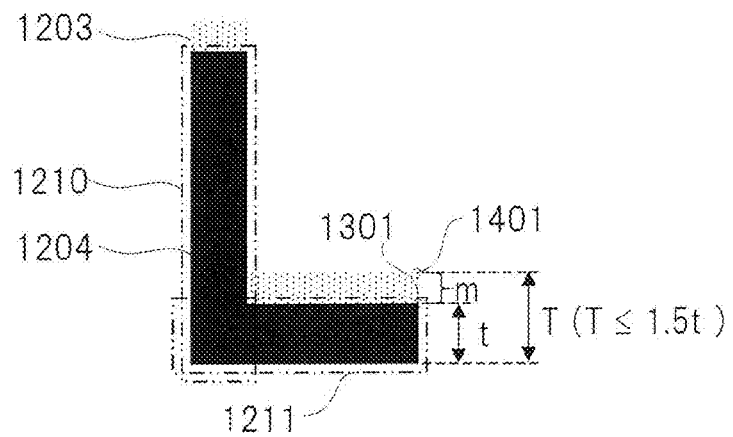
(a)
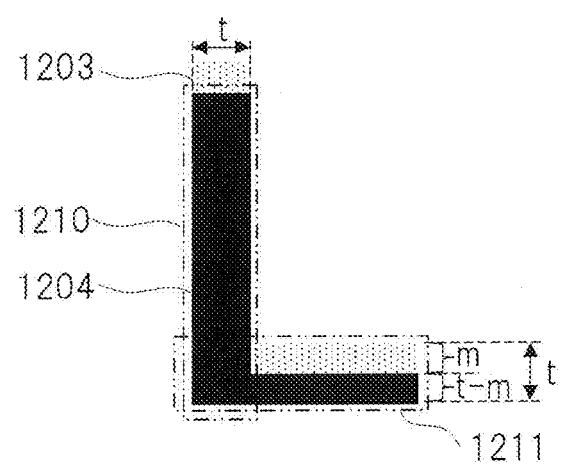
(b)
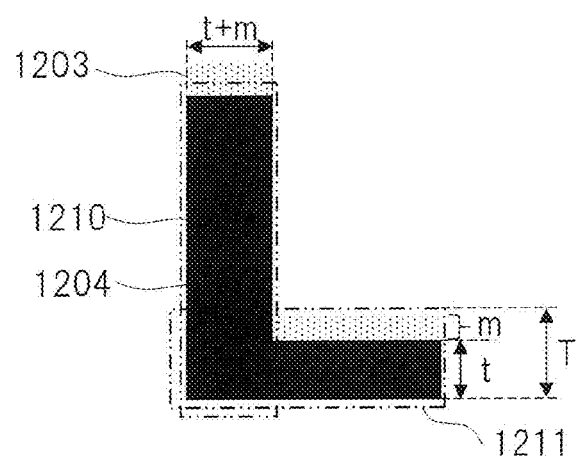
(c)

FIG. 5
(a)
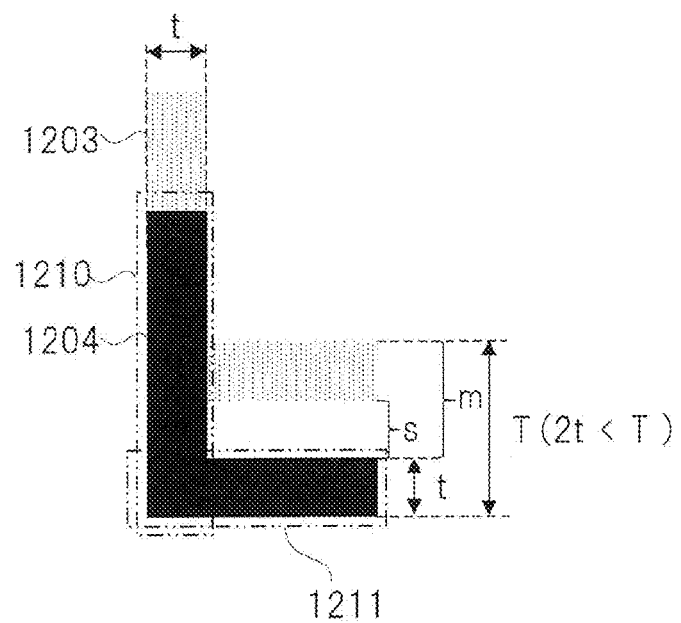
(b)
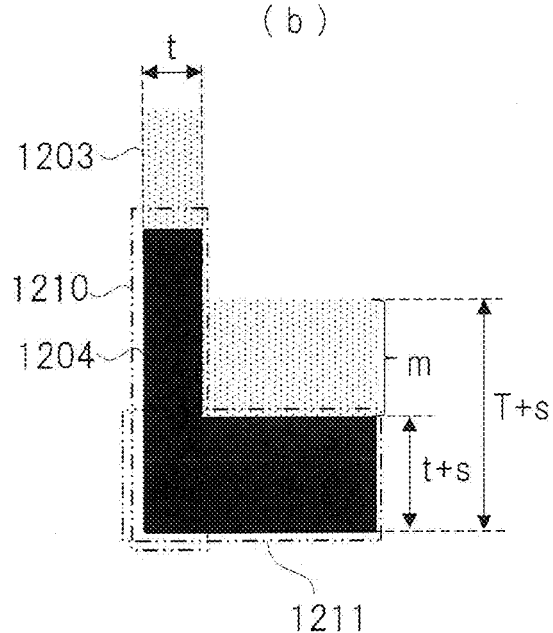

FIG. 6
(a)
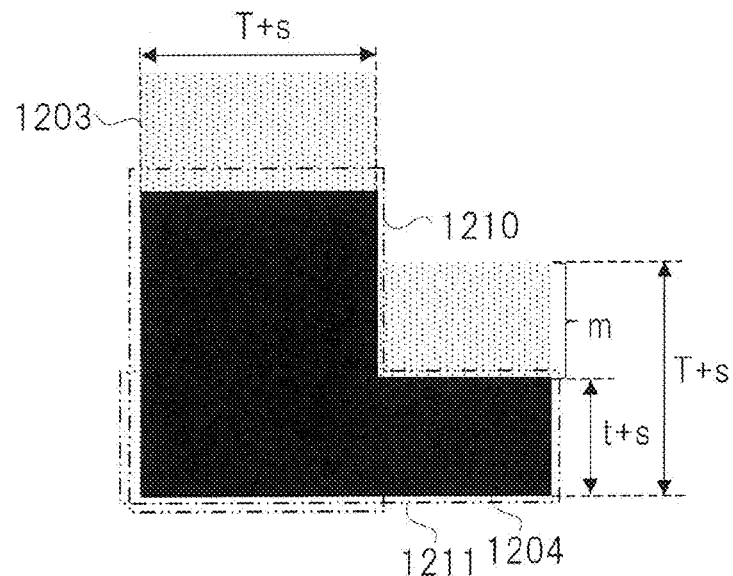
(b)
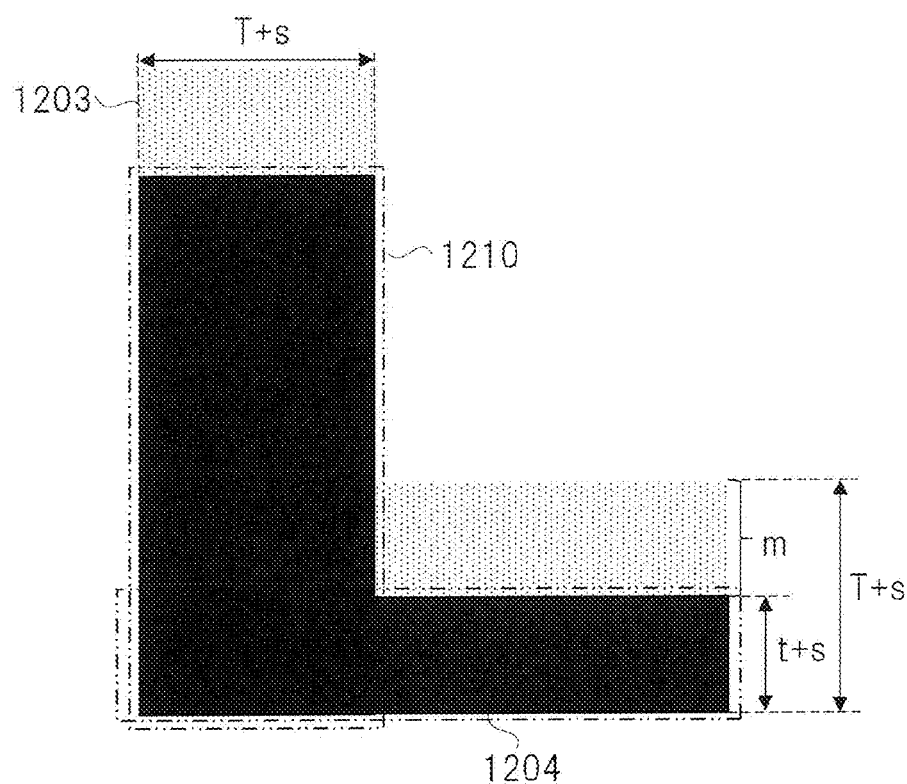

FIG. 7
(a)
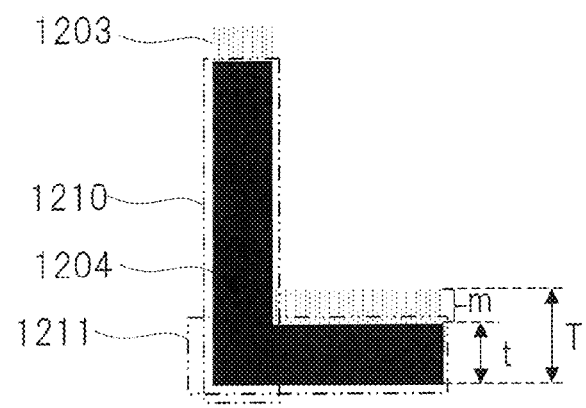
(b)
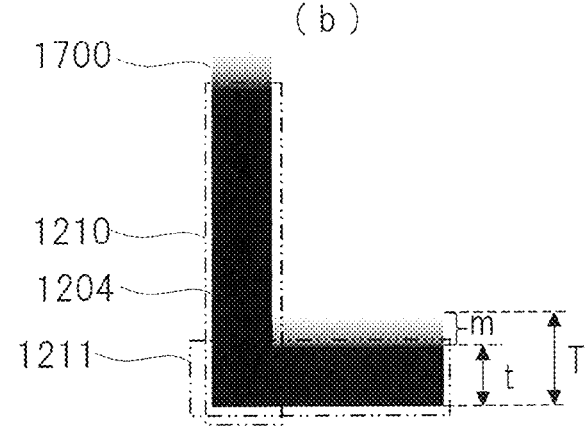

FIG. 8
(a)
DIVIDE CHARACTER
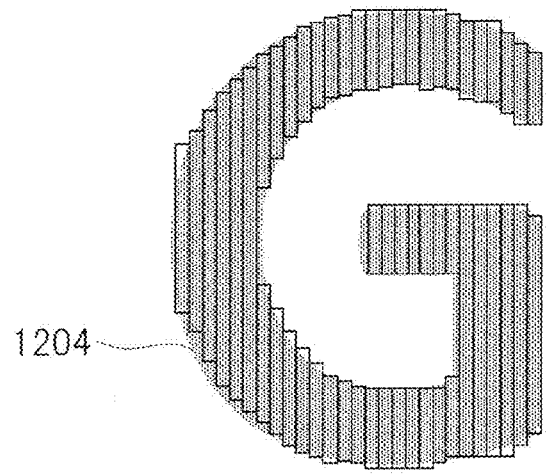
1204
(b)
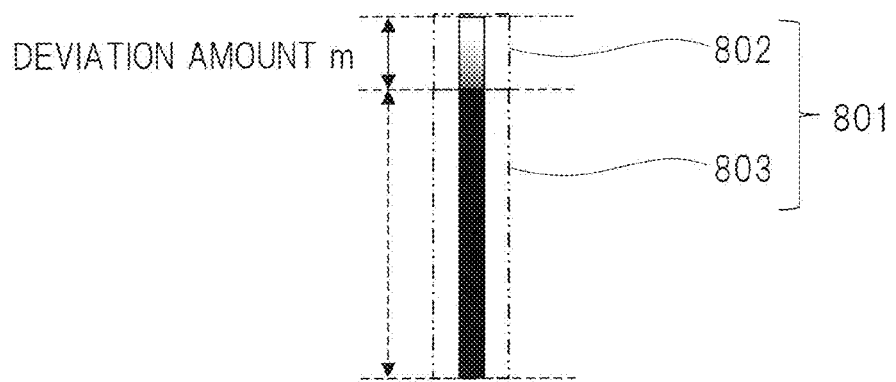
DEVIATION AMOUNT m
802
801
803

DISPLAY DEVICE, DISPLAY IMAGE PROJECTING METHOD AND HEAD UP DISPLAY

TECHNICAL FIELD

The present invention relates to a display device, a display image projecting method, and a head up display.

BACKGROUND ART

In order to enhance safety by suppressing movement of a field of view of a driver, a head up display (HUD) by which vehicle speed and various kinds of alarm displays are projected to a windshield and a projected display image is superimposed on a landscape in front of a vehicle to be displayed has been proposed.

In Japanese Patent Application Publication No. 2015-102695 (Patent Document 1), a technique that "a display device for emitting a display light that expresses an image toward a transparent member to display a virtual image of the image by means of the display light reflected by the transparent member, the display device including: a display configured to emit the display light that expresses the image; and an optical element that is entered by the display light emitted from the display to transmit and emit the entered display light, the optical element emitting the display light toward the transparent member by changing an angle of an optical axis of the emitted light with respect to an optical axis of an incident light, wherein the optical element is allowed to move in parallel, and an optical path of the display light that is emitted from the optical element and reflected by the transparent member changes in accordance with the parallel movement of the optical element" is described.

Further, in Japanese Patent Application Publication No. 2012-83534 (Patent Document 2), a technique of "a transmissive display device including: a display means for forming an image; and a transparent display panel configured to reflect a display light radiated from the display, wherein the display means includes: a main image generating means for generating a main display element, such as a character and a symbol, to be presented to a user; an auxiliary element generating means for generating one or more auxiliary element by changing at least one of a position, luminance, a size, or a color of the main display element; and an image generating means for generating a display image by superimposing one or more of the auxiliary elements onto the main display element" is described.

RELATED ART DOCUMENTS

Patent Documents

Patent document 1: Japanese Patent Application Publication No. 2015-102695
Patent Document 2: Japanese Patent Application Publication No. 2012-83534

SUMMARY OF THE INVENTION

Problems to be Solved by the Invention

In the technique described in Patent Document 1, it becomes possible to display a display image (virtual image) such as a character and a symbol at an equivalent position for users each of whose height of a point of view is different from those of the others. However, in the technique described in Patent Document 1, there is a possibility that a double image is generated due to refraction of the display light and visibility of the display image thus reduces.

Further, in the technique described in Patent Document 2, by superimposing the auxiliary element onto the display image (display element) to display them, stereoscopic expression is made as if the display image has a thickness, whereby it is possible to make the double image inconspicuous. However, in the technique described in Patent Document 2, there is a possibility that a shape of the display image is deformed by superimposing the auxiliary element and visibility of the display image thus reduces.

It is an object of the present invention to provide technique capable of improving visibility of a display image projected by a display device.

Means for Solving the Problem

An outline of representative invention of the present invention disclosed in the present application will briefly be explained as follows.

A display device according to one embodiment of the present invention is a display device configured to project a display image including at least any one of a first image or a second image. A horizontal direction of the first image is longer than a vertical direction thereof, and a vertical direction of the second image is longer than a horizontal direction thereof. The display device includes a controller configured to generate a display image obtained by changing a width of at least any one of the first image or the second image in accordance with a deviation amount between the display image and a ghost image, the ghost image being visually recognized so as to deviate in a deviation direction with respect to the display image. The display device also includes an image display configured to emit display light for projecting the display image generated by the controller.

Further, a display image projecting method according to one embodiment of the present invention is a display image projecting method for a display device configured to project a display image including at least any one of a first image or a second image. A horizontal direction of the first image is longer than a vertical direction thereof, and a vertical direction of the second image is longer than a horizontal direction thereof. The display image projecting method includes a display image generating step in which a controller generates a display image obtained by changing a width of at least any one of the first image or the second image in accordance with a deviation amount between the display image and a ghost image, the ghost image being visually recognized so as to deviate in a deviation direction with respect to the display image. Further, display image projecting method also includes a display light emitting step in which an image display emits a display light for projecting the display image generated by the controller.

Further, a head up display according to one embodiment of the present invention is a head up display including: a display device configured to emit a display light for projecting a display image; a polarization device configured to reflect the display light emitted by the display device; an optical element configured to emit the display light reflected by the polarization device toward a windshield of a vehicle; a pupil position detector configured to calculate pupil position information for specifying a position of a pupil of a driver; and a controller configured to move, on the basis of the pupil position information, a height of the optical element to a position at which a double image is not generated.

Effects of the Invention

Effects obtained by representative invention of the present invention disclosed in the present application will briefly be explained as follows.

According to representative embodiments of the present invention, it is possible to improve visibility of a display image projected by a display device.

BRIEF DESCRIPTIONS OF THE DRAWINGS

Figure 9:
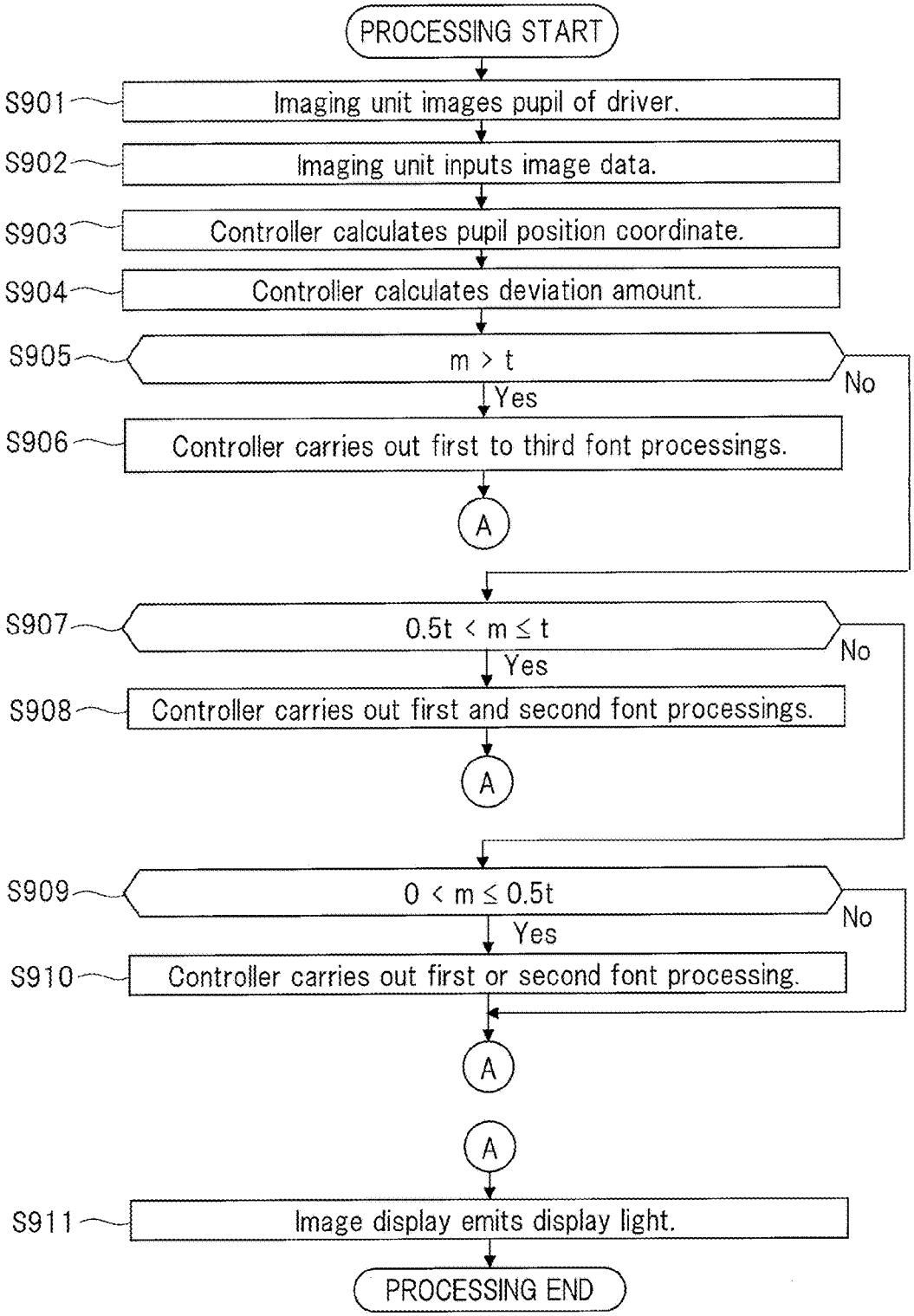
Figure 10:
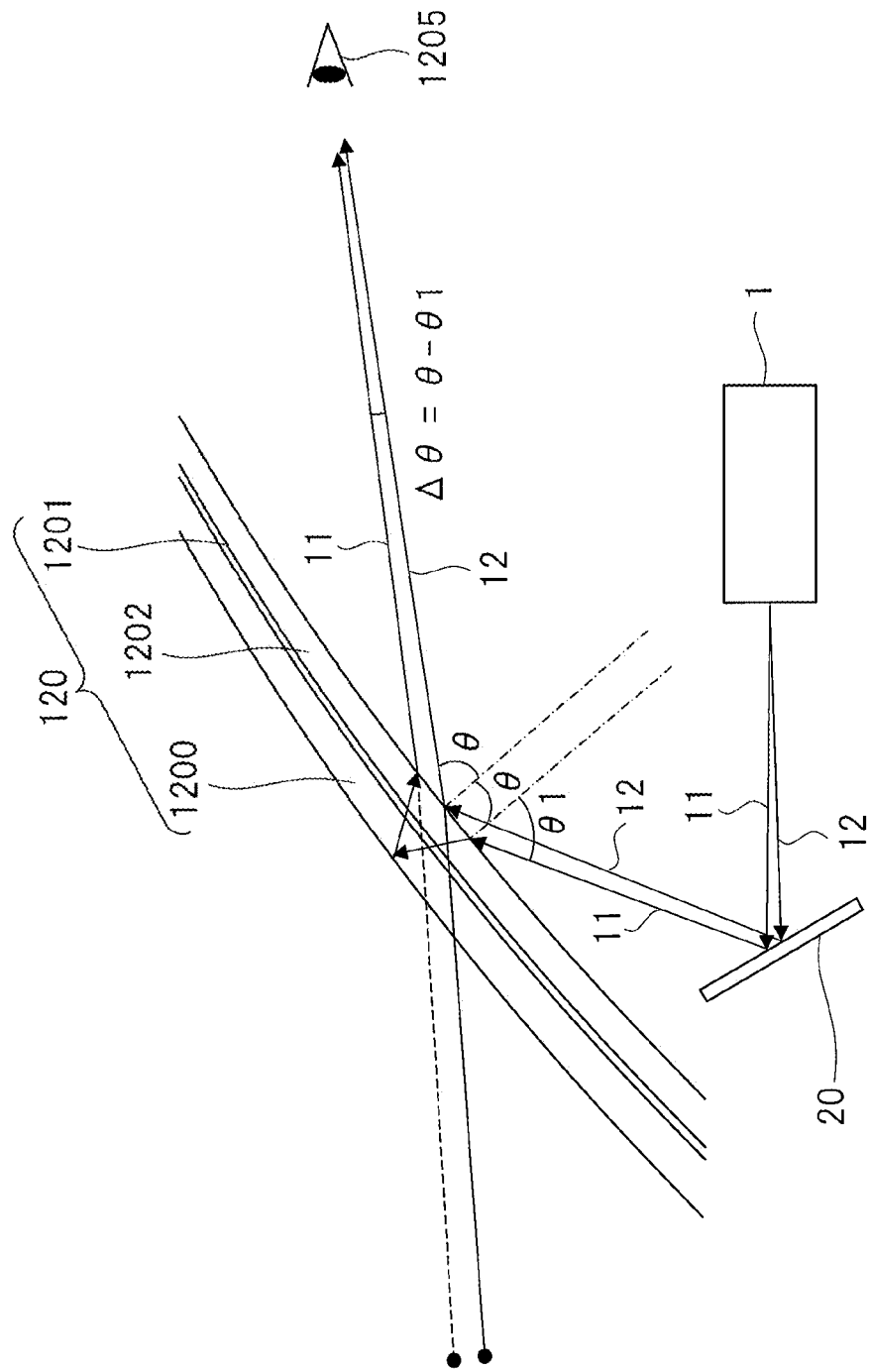
Figure 11:
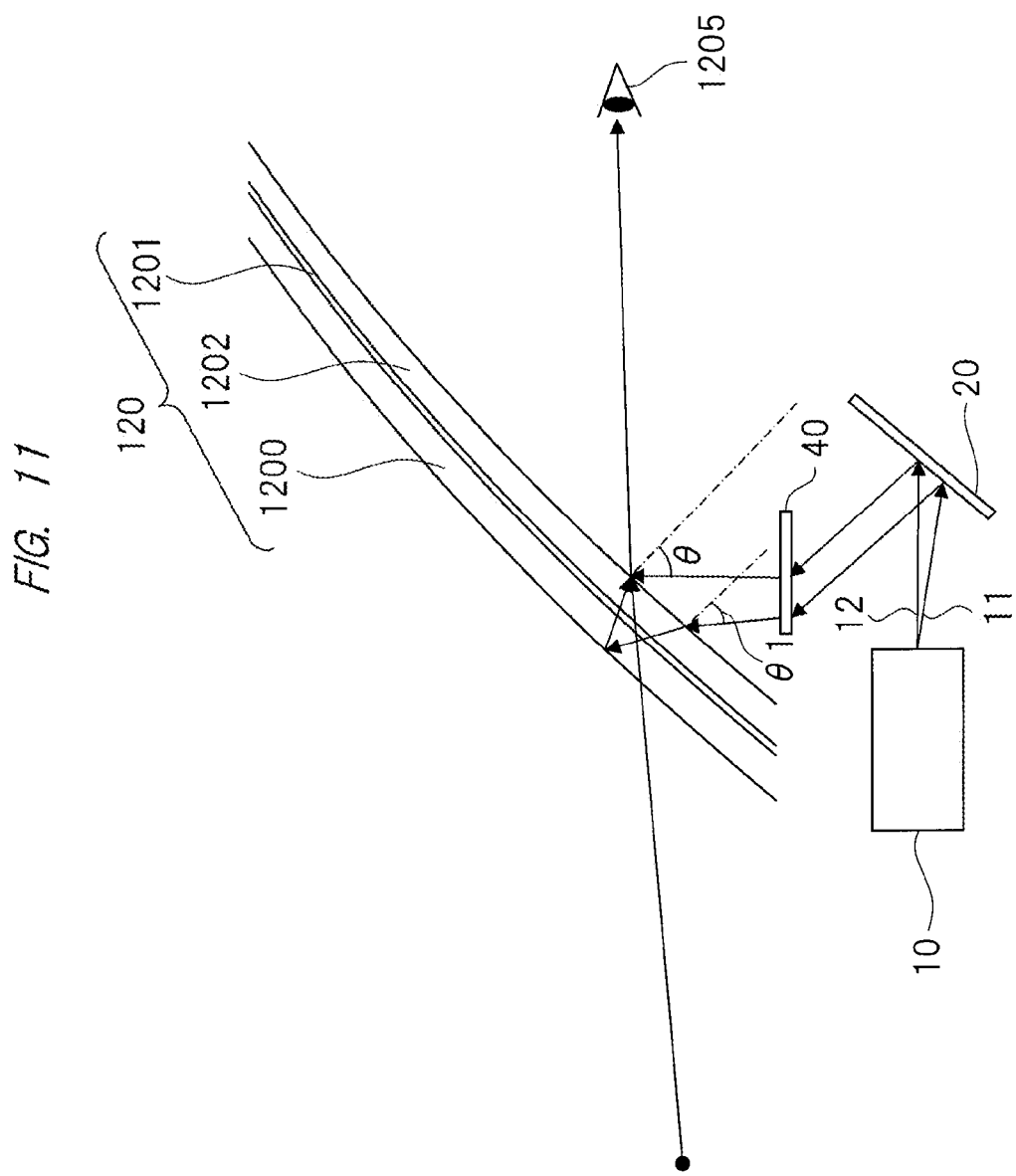
Figure 12:
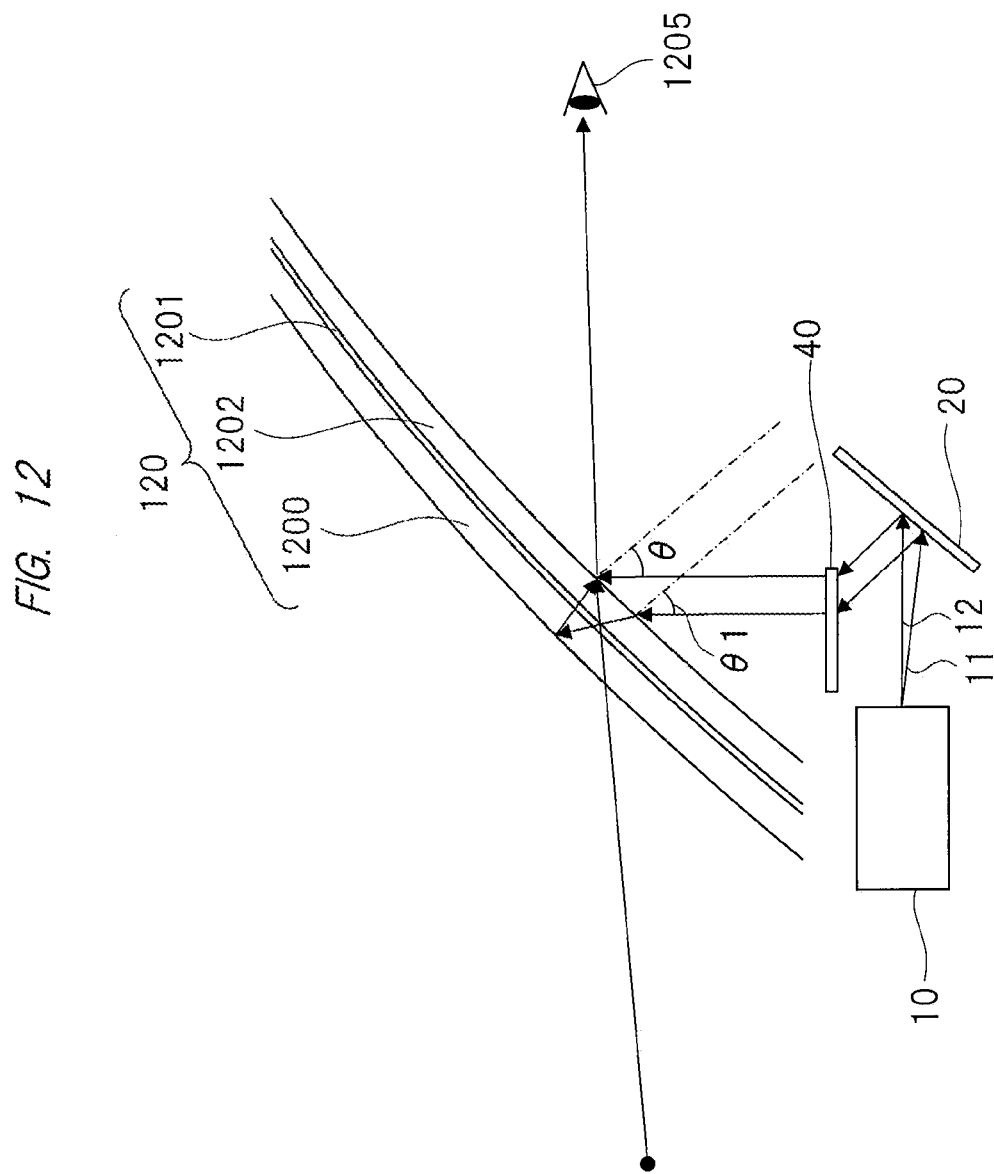
Figure 13:
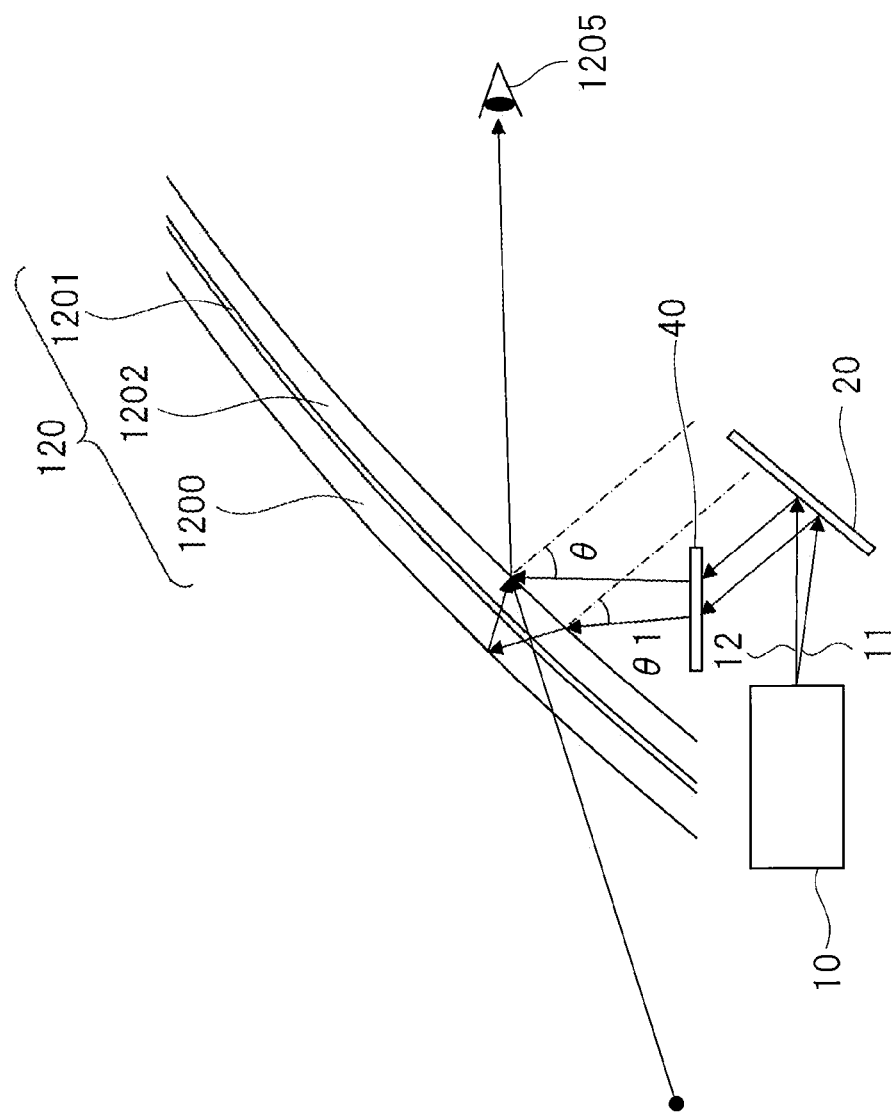
Figure 14:
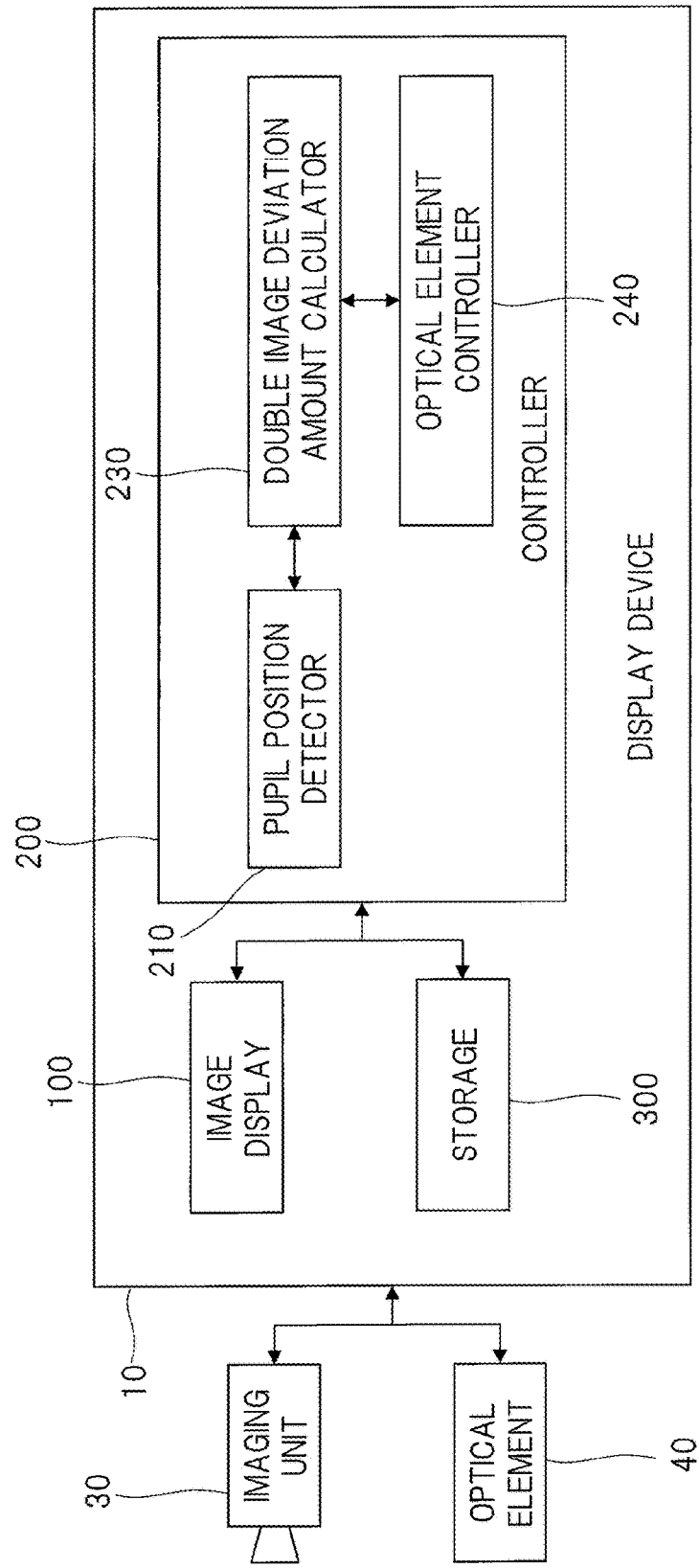

FIGS. 3(a) to 3(c) are views showing display examples according to the first embodiment, FIG. 3(a) is a view showing a display example before font processing, FIG. 3(b) is a view showing a display example after first font processing, and FIG. 3(c) is a view showing a display example after second font processing;

FIGS. 4(a) to 4(c) are views showing display examples according to the first embodiment, FIG. 4(a) is a view showing a display example before the font processing, FIG. 4(b) is a view showing a display example after the first font processing, and FIG. 4(c) is a view showing another display example after the second font processing;

FIGS. 5(a) and 5(b) are views showing display examples according to the first embodiment, FIG. 5(a) is a view showing a display example before the font processing, and FIG. 5(b) is a view showing a display example after the first font processing;

FIGS. 6(a) and 6(b) are views showing display examples according to the first embodiment, FIG. 6(a) is a view showing a display example after the second font processing, and FIG. 6(b) is a view showing a display example after third font processing;

FIGS. 7(a) and 7(b) are views showing display examples according to the first embodiment, FIG. 7(a) is a view showing a display example before the font processing, and FIG. 7(b) is a view showing a display example after fourth font processing;

FIGS. 8(a) and 8(b) are views for explaining the fourth font processing, FIG. 8(a) is a view for explaining a process of extracting a region in which deviation is generated, and FIG. 8(b) is a view for explaining a process of applying gradation to a gradation application range;

FIG. 9 is a view showing an outline of entire processing for the display device according to the first embodiment;

FIG. 10 is a view showing an outline of a configuration example of a conventional head up display;

FIG. 11 is a view showing an outline of a configuration example of a head up display according to a second embodiment;

FIG. 12 is a view showing an outline of a configuration example of the head up display according to the second embodiment;

FIG. 13 is a view showing an outline of a configuration example of the head up display according to the second embodiment; and FIG. 14 is a block diagram showing an outline of a configuration example of the head up display according to the second embodiment.

DETAILED DESCRIPTION OF PREFERRED EMBODIMENTS

Hereinafter, embodiments according to the present invention will be described on the basis of drawings. In this regard, in all Figures for explaining the embodiments, the same numeral reference is attached to the same element in principal, and repeated explanation thereof is omitted.

First Embodiment

<Head Up Display>

Figure 1:
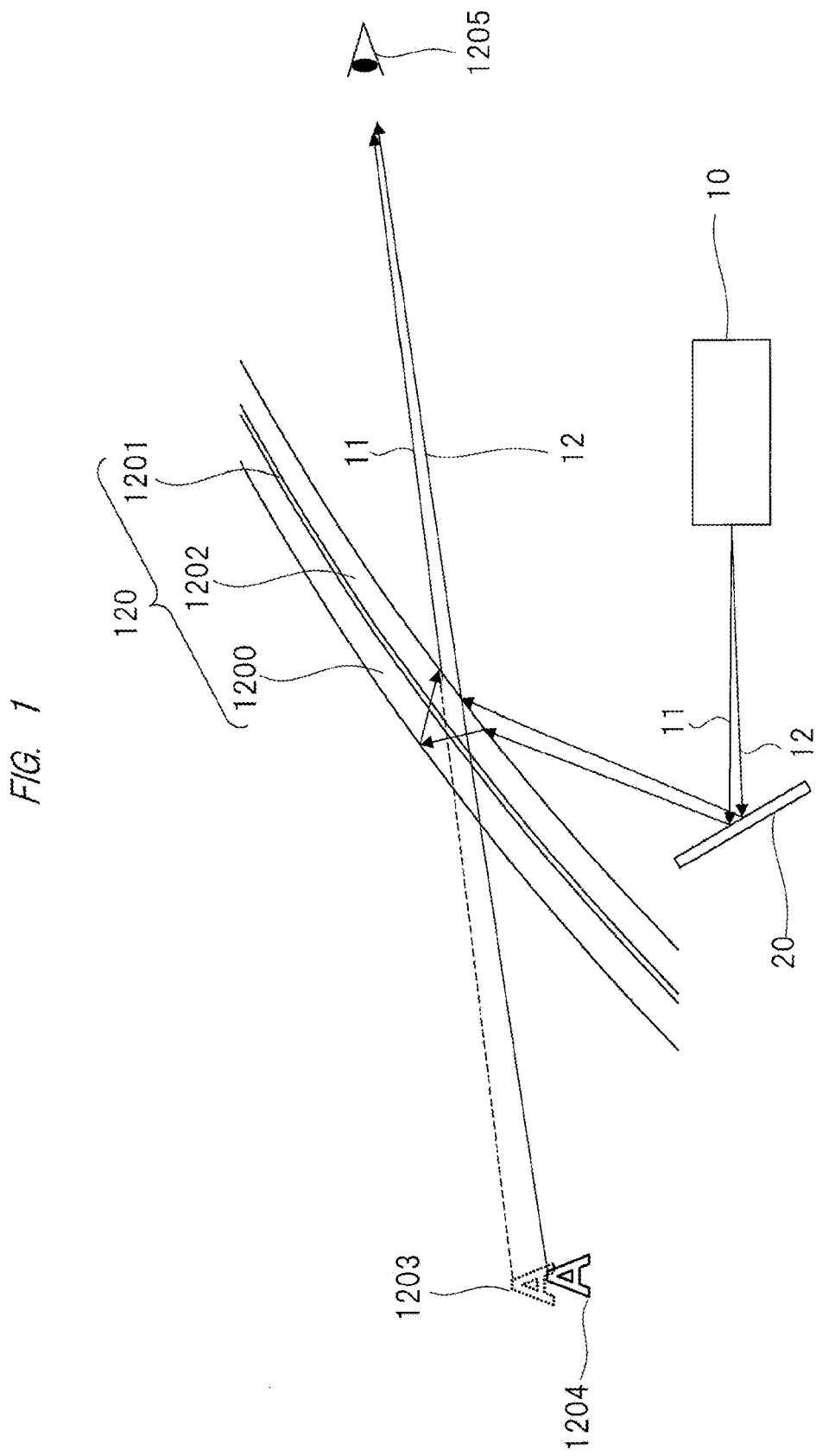
FIG. 1 is a view showing an outline of a configuration example of a head up display according to a first embodiment.

FIG. 1 is a view showing an outline of a configuration example of a head up display according to the first embodiment. Hereinafter, the outline will be described by using a vertical direction (or up-to-down direction) when viewed from a driver as a vertical direction of a display image 1204 and using a horizontal direction (or right-to-left direction) of the driver as a horizontal direction of the display image 1204.

As shown in FIG. 1, a windshield 120 that is a permeable member through which display lights 11, 12 are projected is configured by joining an outer glass 1200, an inner glass 1202, and an intermediate membrane 1201 sandwiched by the outer glass 1200 and the inner glass 1202. The windshield 120 is positioned in front of the driver who drives a vehicle, for example.

For example, in a case where a head up display is incorporated in a navigation apparatus, its operation is as follows. For example, an image that is made of traffic information and the like in the navigation apparatus is projected to the windshield 120 as the display image 1204. The display light 12 projected to the windshield 120 is reflected by the windshield 120, and enters a pupil 1205 of the driver. The driver can then visually recognize the display image 1204, which is made of the traffic information and the like in the navigation apparatus, for example, so as to overlap the display image 1204 on a landscape in front of the vehicle.

A display device 10 and a polarization device 20 are stored in the inside of a dashboard, for example. The display device 10 includes a liquid crystal element and/or a light source, for example. Further, the display device 10 generates the display lights 11, 12 for projecting the display image 1204 to the windshield 120 of the vehicle, and emits the generated display lights 11, 12 to the polarization device 20 that is configured by a mirror or the like. The display image 1204 is made of the traffic information in the navigation apparatus, vehicle speed, various kinds of alarm displays, and the like.

The display lights 11, 12 emitted by the display device 10 are caused to irradiate the polarization device 20. Then, the display lights 11, 12 that irradiate the polarization device 20 are reflected toward the windshield 120. The display lights 11, 12 reflected by the polarization device 20 enters the inner glass 1202.

The display light 12 of the display lights 11, 12 that entered the inner glass 1202 is reflected by a front surface of the inner glass 1202, thereby entering the pupil 1205. This makes it possible for the driver to visually recognize the display image 1204. On the other hand, the display light 11 of the display lights 11, 12 that entered the inner glass 1202 is reflected by a back surface of the outer glass 1200, thereby entering the pupil 1205. This makes it possible for the driver to visually recognize a ghost image 1203. In this way, there are two optical paths each of which reaches the pupil 1205, and thus, the driver visually recognizes the display image 1204 and the ghost image 1203 so as to doubly overlap up and down.

<Display Device>

Figure 2:
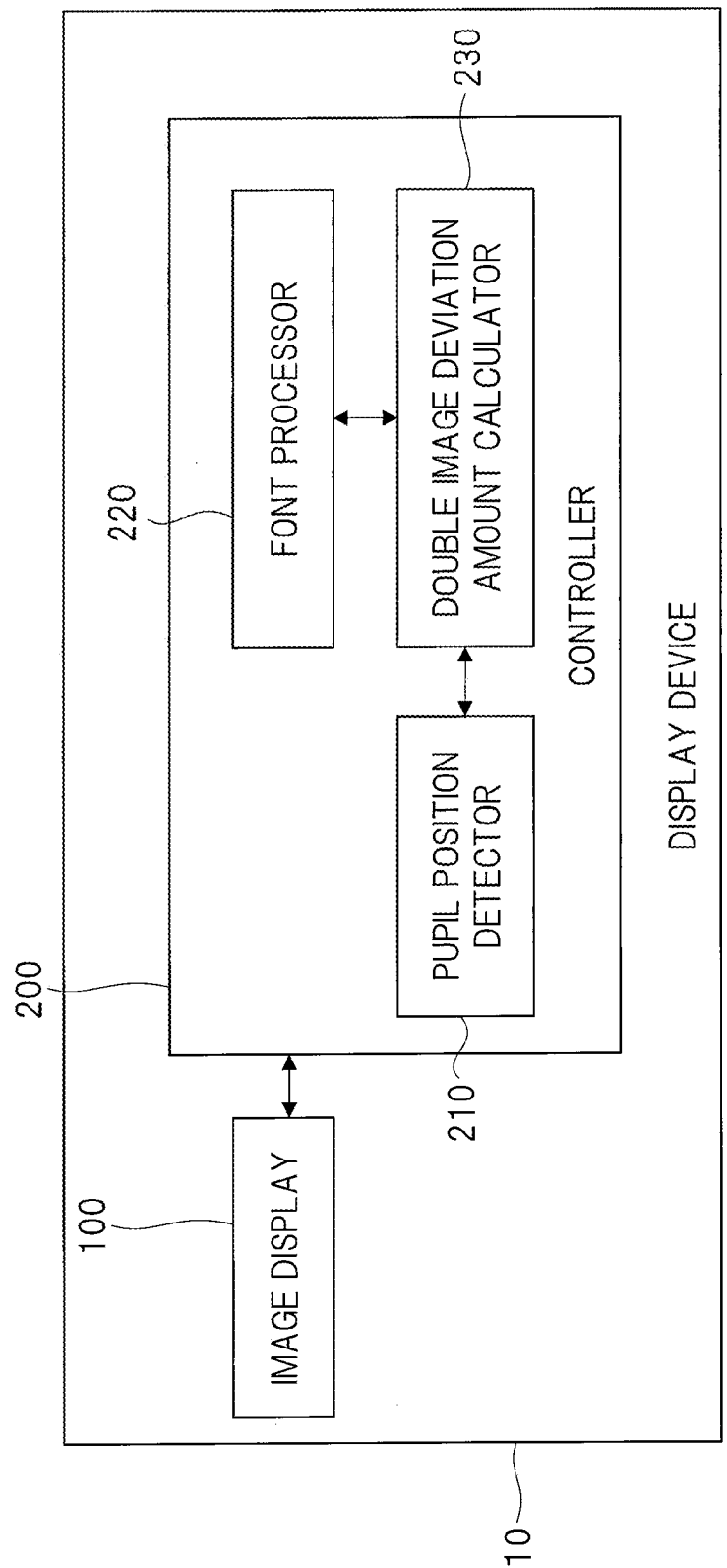
FIG. 2 is a block diagram showing an outline of a configuration example of a display device according to the first embodiment.

FIG. 2 is a view showing an outline of a configuration example of the display device 10 according to the first embodiment. As shown in FIG. 2, the display device 10 includes an image display 100 and a controller 200.

Further, predetermined hardware and software are implemented to the display device 10. For example, the display device 10 includes a processor, a memory and the like, and causes a computer of the display device 10 to function by means of execution of a program on the memory by the processor.

The controller 200 includes a pupil position detector 210, a font processor 220, and a double image deviation amount calculator 230.

The controller 200 generates a display image obtained by changing (i.e., changing in a short direction) a width of at least any one of a first image extending in a horizontal direction (a horizontal direction thereof is longer than a vertical direction thereof) and a second image extending in a vertical direction (a vertical direction thereof is longer than a horizontal direction thereof) in accordance with a deviation amount m between a display image and a ghost image that is visually recognized so as to deviate in a deviation direction with respect to the display image. In this regard, the first image included in the display image (horizontal line) is a figure that shows a straight line or a curve line extending in a horizontal direction (horizontal direction), and the content of traffic information (for example, an arrow). Further, the second image included in the display image (vertical line) is a figure that shows a straight line or a curve line extending in a vertical direction (vertical direction), and the content of traffic information (for example, an arrow).

For example, the pupil position detector 210 of the controller 200 detects a position of a pupil by analyzing image data of an image including the pupil of the driver. The image data are inputted from an imaging unit (the imaging unit is fitted to a rearview mirror, a meter panel or the like of the vehicle in a state where an imaging element faces in a direction of the driver). Further, the pupil position detector 210 calculates a pupil position coordinate for specifying the detected position of the pupil. The pupil position detector 210 then inputs the calculated pupil position coordinate into the double image deviation amount calculator 230. In this regard, the pupil position detector 210 may calculate the pupil position coordinate on the basis of a fitted position of the mirror (or the rearview mirror) of the vehicle (which is specified by a three-dimensional coordinate for specifying a position to which the mirror is fitted), an angle of the mirror in the vertical direction by using a horizontal plane as a reference, and an angle of the mirror in the horizontal direction by using a vertical plane orthogonal to the mirror.

The double image deviation amount calculator 230 of the controller 200 calculates the deviation amount m between the display image and the ghost image on the basis of a tilt of the pupil position coordinate inputted from the pupil position detector 210 and a position of the polarization device 20 (a tilt with respect to the horizontal plane), a tilt of the windshield 120 (a tilt with respect to the horizontal plane), and a thickness of the windshield 120. The double image deviation amount calculator 230 inputs the calculated deviation amount m into the font processor 220.

FIG. 3(*a*) to FIG. 3(*c*) are views for explaining an example of the font processing. Hereinafter, font processing in a case where the deviation amount m is equal to or narrower than a value half of t, which is a width of a vertical line 1210 and a width of a horizontal line 1211 will be described. As shown in FIG. 3(*a*) to FIG. 3(*c*), the display image 1204 includes a horizontal line 1211, which is a first image extending in a horizontal direction, and a vertical line 1210, which is a second image extending in a vertical direction. In this regard, the display image 1204 is not necessarily include the first image extending in the horizontal direction and the second image extending in the vertical direction, but includes at least any one thereof.

FIG. 3(*a*) is a view showing a display example before the font processing. In an example shown in FIG. 3(*a*), the ghost image 1203 is visually recognized so as to deviate upward in the deviation direction by the deviation amount m with respect to the display image 1204. For example, the deviation amount m is a distance from each part of the display image 1204 (an upper right corner 1301, a lower left corner 1302, or the like) to each corresponding part of the Ghost image 1203 (an upper right corner 1401, a lower left corner, or the like). More specifically, for example, a distance from the upper right corner 1301 of the display image to the upper right corner 1401 of the ghost image becomes the deviation amount m.

In the example shown in FIG. 3(*a*), the deviation amount m inputted into the font processor 220 of the controller 200 is equal to or narrower than the value half of t (a value obtained by multiplying 0.5 by t), which is the width of the vertical line 1210 and the width of the horizontal line 1211 of the display image 1204. Then, the ghost image 1203 with the deviation amount m is visually recognized upward of the vertical line 1210 and the horizontal line 1211 that constitute the display image 1204.

Further, the width of the vertical line 1210 is visually recognized as t, but the width of the horizontal line 1211 is visually recognize as a width T obtained by adding a width t to the deviation amount m so as to be integral with the upper ghost image 1203. For that reason, in the example shown in FIG. 3(*a*), it is visually recognized so that the width of the horizontal line 1211, which is displayed integrally with the ghost image 1203, becomes thicker than the width of the vertical line 1210. Since the width of the vertical line 1210 is different from the width of the horizontal line 1211, this gives the driver a feeling of strangeness.

FIG. 3(*b*) is a view showing a display example after first font processing. In a case where the deviation amount m is equal to or narrower than the value half of t, the font processor 220 of the controller 200 carries out first font processing in which the display image 1204 obtained by changing the width of the horizontal line (first image) 1211 in accordance with the inputted deviation amount m is generated. Specifically, the font processor 220 generates the display image 1204 by making the width of the horizontal line 1211 thin by the deviation amount m. In this regard, the font processor 220 may make the width of the horizontal line 1211 thinner toward an upward direction thereof or a downward direction.

Thus, the horizontal line 1211 with the width of t−m is visually recognized as the width t integrally with the upper ghost image 1203 with the width of m. The width of the horizontal line 1211, which is displayed integrally with the ghost image 1203 is visually recognized so as to be the same width as the width of the vertical line 1210, and it is possible to suppress a feeling of strangeness from being given to the driver.

In this regard, as shown in FIG. 3(*c*), in a case where the deviation amount m is equal to or narrower than the value half of t, the font processor 220 may carry out second font processing in which the display image 1204 obtained by changing the width of the vertical line (second image) 1211 in accordance with the inputted deviation amount m is generated. Specifically, the font processor 220 generates the display image 1204 by making the width of the vertical line 1210 thick by the deviation amount m.

Thus, the horizontal line 1211 with the width of t is visually recognized as the width t+m integrally with the upper ghost image 1203 with the width of m. The width of the horizontal line 1211, which is displayed integrally with the ghost image 1203 is visually recognized so as to be the same width as the width of the vertical line 1210, and it is possible to suppress a feeling of strangeness from being given to the driver. In this regard, the font processor 220 may make the width of the vertical line 1210 thicker in a left direction or in a right direction.

Next, the font processing in a case where the deviation amount m is equal to or thicker than a value half of t, which is the width of the vertical line 1210 and the width of the horizontal line 1211, and thinner than t will be described by using FIGS. 4(*a*) to (*c*).

Figure 4:
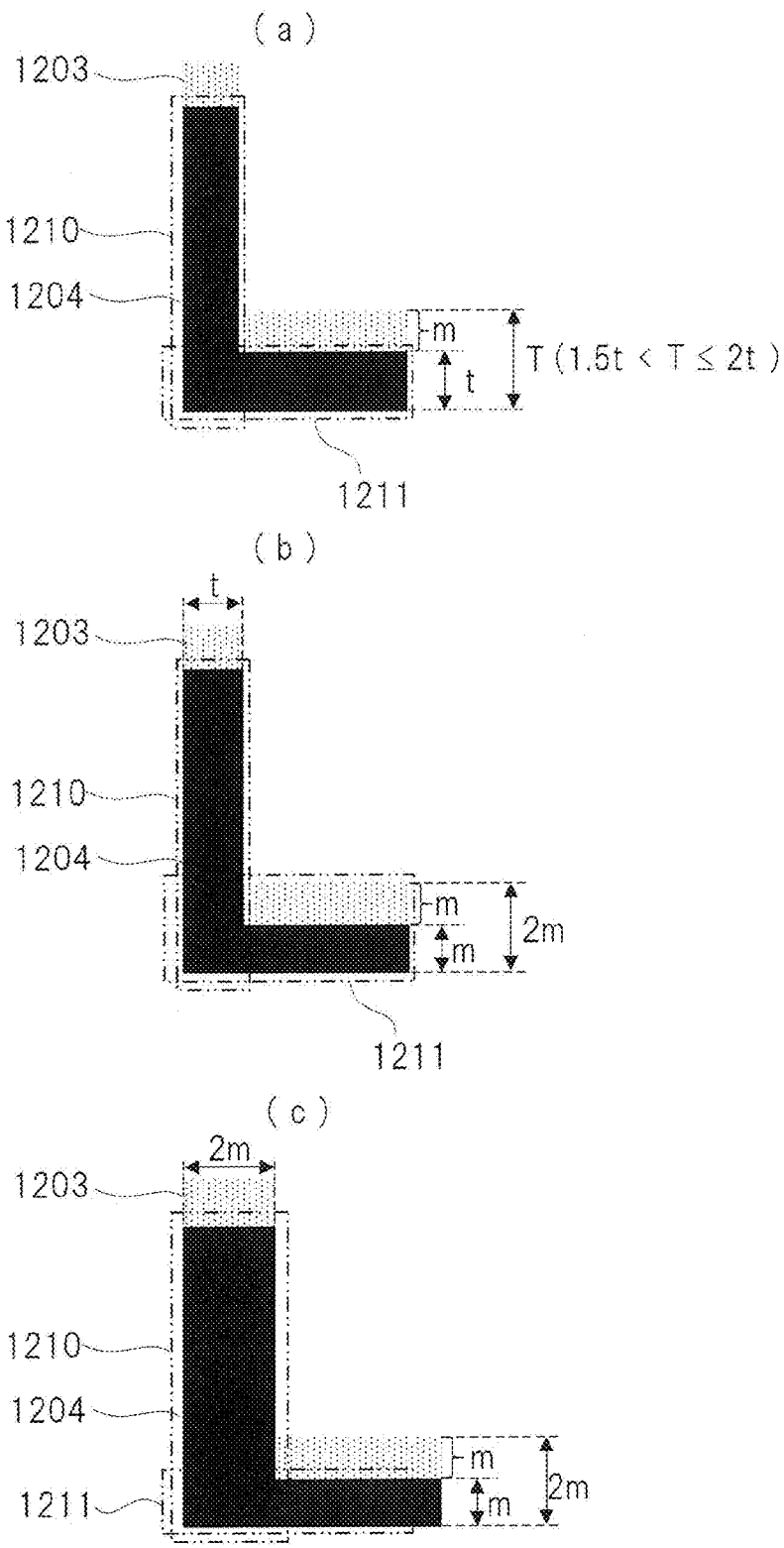

FIG. 4(*a*) is a view showing a display example before the font processing. In an example shown in FIG. 4(*a*), the ghost image 1203 is visually recognized so as to deviate upward by the deviation amount m with respect to the display image 1204. In the example shown in FIG. 4(*a*), the deviation amount m exceeds the value half of t (the value obtained by multiplying 0.5 by t), which is the width of the vertical line 1210 and the width of the horizontal line 1211 of the display image 1204, and is equal to or narrower than t.

FIG. 4(*b*) is a view showing a display example after the first font processing. Further, FIG. 4(*c*) is a view showing a display example after the second font processing. In a case where the deviation amount m exceeds the value half of t and is equal to or narrower than t, the font processor 220 of the controller 200 first carries out the first font processing, which will be explained by using FIG. 4(*b*), in accordance with the inputted deviation amount m, and then carries out the second font processing, which will be explained by using FIG. 4(*c*). Specifically, in a case where the deviation amount m exceeds the value half of t and is equal to or narrower than t, the font processor 220 generates the display image 1204 obtained by making the width of the horizontal line thin by 2t−T and making the width of the vertical line 1210 thick by 2m−t.

The first font processing causes the width of the horizontal line (first image) 1211 to become T−t (that is, the deviation amount m). Further, the horizontal line 1211 is visually recognized as a width 2m (a width obtained by multiplying the deviation amount m by two) integrally with the upper ghost image 1203. Further, the second font processing causes the width of the vertical line (second image) 1210 to become thick by 2m−t. The width of the vertical line 1210 then becomes 2m. Thus, the vertical line 1210 is visually recognized so as to be the same width as the width of the horizontal line 1211, which is displayed integrally with the ghost image 1203, and it is possible to suppress a feeling of strangeness from being given to the driver.

Next, the font processing in a case where the deviation amount m exceeds the value of t, which is the width of the vertical line 1210 and the width of the horizontal line 1211 will be described by using FIG. 5(*a*), FIG. 5(*b*), FIG. 6(*a*), and FIG. 6(*b*). In this regard, in a case where a shape of a character is complicated (for example, in a case where the character is kanji (Chinese character) or hiragana), the font processing shown in any of FIG. 5(*a*), FIG. 5(*b*), FIG. 6(*a*), and FIG. 6(*b*) may be carried out.

FIG. 5(*a*) is a view showing a display example before the font processing. In an example shown in FIG. 5(*a*), the ghost image 1203 is visually recognized so as to deviate upward by the deviation amount m with respect to the display image 1204. In the example shown in FIG. 5(*a*), the deviation amount m exceeds the value of t, which indicates the width of the vertical line 1210 and the width of the horizontal line 1211 in the display image 1204, and a gap with a height of s can be visually recognized between the horizontal line 1211 of the display image 1204 and the ghost image 1203.

In a case where the deviation amount m exceeds the value of t, the font processor 220 of the controller 200 first carries out first font processing, which will be explained by using FIG. 5(*b*), in accordance with the inputted deviation amount m; then carries out second font processing, which will be explained by using FIG. 6(*a*); and finally carries out third font processing, which will be explained by using FIG. 6(*b*).

FIG. 5(*b*) is a view showing a display example after the first font processing. Further, FIG. 6(*a*) is a view showing a display example after the second font processing.

The font processor 220 carries out the first font processing (FIG. 5(*b*)) in which the width of the horizontal line (first image) 1211 is made thick by s (which is a height of a gap and is equal to T−2t); then carries out the second font processing (FIG. 6(*a*)) in which the width of the vertical line (second image) 1210 is made thick by s+m (a value obtained by adding the height of the gap to the deviation amount m); and finally carries out the third font processing (FIG. 6(*b*)) in which a length of the vertical line 1210 is made longer to a length of (T+s+m)/t times compared with the length before the third font processing and a length of the horizontal line 1211 is made longer to a length of (T+s+m)/t times compared with the length before the third font processing.

As shown in FIG. 5(*b*), by carrying out the first font processing, there is no gap between the horizontal line 1211 of the display image 1204 and the ghost image 1203. Further, the horizontal line 1211 is visually recognized as the width T+s integrally with the upper ghost image 1203.

Further, as shown in FIG. 6(*a*), the width of the vertical line 1210 becomes T+s. This causes the vertical line 1210 to be visually recognized as the same width as the width of the horizontal line 1211 displayed integrally with the ghost image 1203.

Here, in a case where the width of each of the vertical line 1210 and the horizontal line 1211 displayed integrally with the ghost image 1203 is T+s, the vertical line 1210 and the horizontal line 1211 are made too thick, and there is a possibility that legibility (or readability) of the character is deteriorated. Thus, the third font processing of adjusting an aspect ratio is to be carried out after the first font processing and the second font processing were carried out.

As shown in FIG. 6(*b*), the third font processing causes the length of the vertical line 1210 to be made long to a length of (T+s+m)/t times compared with the length thereof before the third font processing. Further, the length of the horizontal line 1211 is made long to a length of (T+s+m)/t times compared with the length before the third font processing. Namely, in a case where the deviation amount m between the display image 1204 and the ghost image 1203 exceeds the width of the horizontal line, the controller 200 generates the display image 1204 obtained by making the width of the horizontal line and the width of the vertical line thick and making the length of the horizontal line and the length of the vertical line long. Thus, the vertical line 1210 can be visually recognized as the same width as the width of the horizontal line 1211 displayed integrally with the ghost image 1203. In addition, it is possible to maintain the shape of the character before the first font processing and the second font processing are carried out, and this makes it possible to maintain legibility of the character.

Next, other font processing in a case where the deviation amount m is equal to or narrower than the value half of t, which is the width of the vertical line 1210 and the width of the horizontal line 1211, will be described by using FIG. 7(*a*) and FIG. 7(*b*).

FIG. 7(*a*) is a view showing a display example before the font processing. In an example shown in FIG. 7(*a*), the ghost image 1203 is visually recognized so as to deviate in the deviation direction (upward in the case of FIG. 7(*a*)) by the deviation amount in with respect to the display image 1204. The ghost image 1203 with the deviation amount m is visually recognized upward of the vertical line 1210 and the horizontal line 1211 that constitute the display image 1204.

FIG. 7(*b*) is a view showing a display example after fourth font processing. As shown in FIG. 7(*b*), the fourth font processing by the font processor 220 causes a ghost image 1700 subjected to gradation processing to be displayed in a region at which the ghost image 1203 is visually recognized. Namely, the font processor 220 carries out the gradation processing for the display image 1204 so as to reduce luminance from a color of the display image 1204 in a stepwise manner, whereby the ghost image 1700 subjected to the gradation processing is displayed. A visually recognized image obtained by combining the display image 1204 subjected to the gradation processing and the ghost image 1700 subjected to the gradation processing can be visually recognized as one image obtained by subjecting the whole image to the gradation processing, and it is possible to suppress a feeling of strangeness from being given to the driver.

Hereinafter, the fourth font processing will be described in detail by using FIG. 8(*a*) and FIG. 8(*b*). FIG. 8(*a*) is a view for explaining a process of extracting a region in which deviation is generated, and FIG. 8(*b*) is a view for explaining a process of applying gradation to a gradation application range.

As shown in FIG. 8(*a*), the font processor 220 of the controller 200 first divides the display image 1204 into strip forms at predetermined intervals in a direction that the deviation is generated. In an example shown in FIG. 8(*a*), the deviation is generated in a vertical direction. For that reason, the font processor 220 divides the display image 1204 into strip forms at predetermined intervals in the vertical direction. In a case where deviation is generated in a horizontal direction, the font processor 220 divides the display image 1204 into strip forms at predetermined intervals in the horizontal direction. Further, in a case where deviation is generated in an oblique direction, the font processor 220 divides the display image 1204 into strip forms at predetermined intervals in the oblique direction.

Next, as shown in FIG. 8(*b*), the font processor 220 extracts a gradation application range 802 and a gradation non-application range 803 from a divided display image 801 obtained by being divided into the strip forms. In this regard, the font processor 220 extracts a region with a width t of deviation in a deviation direction side of the divided display image 801 as the gradation application range 802, and extracts the other region as the gradation non-application range 803. Then, the font processor 220 generates a gradation display image by reducing luminance of the gradation application range 802 extracted from the display image 1204 in a stepwise manner from the color of the display image.

The image display 100 emits display lights for projecting the display image 1204 generated by the processing shown in any of FIG. 3 to FIG. 8 described above by the font processor 220 of the controller 200.

<Entire Processing>

FIG. 9 is a view showing an outline of entire processing of the display device 10 according to the first embodiment.

First, at S901, an imaging unit 30 images the pupil 1205 of the driver.

Next, at S902, the imaging unit 30 inputs image data of an image, which contains the pupil 1205 of the driver imaged at S901, into the controller 200.

Next, at S903, the pupil position detector 210 of the controller 200 detects a position of a pupil by analyzing image data inputted from the imaging unit 30. Further, the pupil position detector 210 calculates a pupil position coordinate for specifying the detected position of the pupil. The pupil position detector 210 then inputs the calculated pupil position coordinate into the double image deviation amount calculator 230.

Next, at S904, the double image deviation amount calculator 230 of the controller 200 calculates a deviation amount m between a display image 1204 and a ghost image 1203 on the basis of the pupil position coordinate inputted at S903, a position and a tilt (a tilt with respect to a horizontal plane) of the polarization device 20, a tilt of the windshield 120 (a tilt with respect to the horizontal plane), and a thickness of the windshield 120. The double image deviation amount calculator 230 inputs the calculated the deviation amount m into the font processor 220.

Next, at S905, the font processor 220 of the controller 200 determines whether the deviation amount m inputted at S904 exceeds a width of a character (t) or not. In a case where the font processor 220 of the controller 200 determines that the deviation amount m does not exceed the width of the character (t) ("No" at S905), the processing flow shifts to S907. On the other hand, in a case where the font processor 220 of the controller 200 determines that the deviation amount m exceeds the width of the character (t) ("Yes" at S905), the processing flow shifts to S906.

Next, at S906, the font processor 220 of the controller 200 carries out the first font processing (FIG. 5(*b*) described above) by making the width of the horizontal line 1211 thick by s (which is the height of the gap and is equal to T−2t). Further, the font processor 220 carries out the second font processing (FIG. 6(*a*) described above) by making the width of the vertical line 1210 thick by s+m (the value obtained by adding the height of the gap to the deviation amount m). Further, the font processor 220 carries out the third font processing (FIG. 6(*b*) described above) by making the length of the vertical line 1210 longer to the length of (T+s+m)/t times compared with the length before the third font processing and making the length of the horizontal line 1211 longer to the length of (T+s+m)/t times compared with the length before the third font processing.

In a case where it is No at S905, at S907, the font processor 220 of the controller 200 determines whether the deviation amount m inputted at S904 exceeds a value obtained by multiplying the width of the character (t) by 0.5 and is equal to or narrower than the width of the character (t) or not. In a case where the font processor 220 of the controller 200 determines that the deviation amount m does nor exceed the width of the character (t) multiplied by 0.5 or is not equal to or narrower than the width of the character (t) ("No" at S907), the processing flow shifts to S909. On the other hand, in a case where the font processor 220 of the controller 200 determines that the deviation amount m exceeds the width of the character (t) multiplied by 0.5 and is equal to or narrower than the width of the character (t) ("Yes" at S907), the processing flow shifts to S908.

Next, at S908, the font processor 220 carries out the first font processing (FIG. 4(*b*) described above), and then carries out the second font processing (FIG. 4(*c*) described above). Specifically, the font processor 220 generates the display image 1204 by making the width of the horizontal line thin by 2t−T and making the width of the vertical line 1210 thick by 2m−t.

In a case where it is No at S907, at S909, the font processor 220 of the controller 200 determines whether the deviation amount m inputted at S904 is not 0 and is equal to or narrower than the value obtained by multiplying the width of the character (t) by 0.5 or not. In a case where the font processor 220 of the controller 200 determines that the deviation amount m is 0, that is, there is no deviation ("No" at S909), the font processor 220 does not carry out the processing, and the processing flow shifts to S911. On the other hand, in a case where the font processor 220 of the controller 200 determines that the deviation amount m is not 0 and is equal to or narrower than the value obtained by multiplying the width of the character (t) by 0.5 ("Yes" at S909), the processing flow shifts to S910.

Next, at S910, the font processor 220 generates the display image 1204 obtained by making the width of the horizontal line thin by the deviation amount m. Alternatively, the font processor 220 generates the display image 1204 obtained by making the width of the vertical line thick by the deviation amount m.

Finally, at S911, the image display 100 emits display lights for projecting the display image 1204 that the font processor 220 of the controller 200 generates by any process of S906, S908, and S910 described above.

<Effects of First Embodiment>

According to the display device 10 of the first embodiment described above, the controller 200 generates the display image 1204 obtained by changing the width of at least any one of the horizontal line 1211 and the vertical line 1210 included in the display image 1204 in accordance with the deviation amount between the display image 1204 and the ghost image 1203, whereby it is possible to make the double image inconspicuous even in a case where a display area of the head up display is increased in size. This makes it possible to improve visibility of the display image 1204 projected by the display device 10.

Further, in a case where the deviation amount between the display image 1204 and the ghost image 1203 does not exceed the width of the horizontal line 1211, the controller 200 generates the display image 1204 by making the width of the vertical line 1210 thick by the deviation amount, whereby the width of the horizontal line 1211 displayed integrally with the ghost image 1203 is visually recognized as the same width as the width of the vertical line 1210, and it is possible to suppress a feeling of strangeness from being given to the driver.

Further, in a case where the deviation amount between the display image 1204 and the ghost image 1203 does not exceed the width of the horizontal line 1211, the controller 200 generates the display image 1204 obtained by making the width of the horizontal line 1211 thin by the deviation amount. Therefore, it is possible to suppress a feeling of strangeness from being given to the driver without changing external appearance of the display image 1204 that is visually recognized integrally with the ghost image 1203 from external appearance the display image 1204 before the font processing.

Further, in a case where the deviation amount between the display image 1204 and the ghost image 1203 exceeds the width of the horizontal line 1211, the controller 200 makes the width of the horizontal line 1211 and the width of the vertical line 1210 thick and makes the length of the horizontal line 1211 and the length of the vertical line 1210 longer, whereby it is possible to improve legibility of the character while suppressing a feeling of strangeness from being given to the driver.

Further, the controller 200 generates the display image 1204 subjected to gradation processing by changing luminance so as to reduce in a stepwise manner or continuously from the color of the display image 1204 to the deviation direction, whereby it is possible to make the double image inconspicuous.

Second Embodiment

A head up display according to a second embodiment is different from the head up display according to the first embodiment in a point to further include an optical element 40 that is allowed to move in a vertical direction. Hereinafter, the different point between the second embodiment and the first embodiment will mainly be explained by using FIG. 10 to FIG. 14.

FIG. 10 is a view showing an outline of a configuration example of a conventional head up display by which a double image is generated. As shown in FIG. 10, a display device 1 emits generated display lights 11, 12 to a polarization device 20 configured by a mirror or the like.

The display lights 11, 12 emitted by the display device 1 enter the polarization device 20. Then, the display lights 11, 12 that enter the polarization device 20 are reflected toward a windshield. The display lights 11, 12 reflected by the polarization device 20 enter an inner glass 1202.

Here, in an example shown in FIG. 10, an incident angle at which the display light 12 enters the inner glass 1202 of the windshield 120 is θ, and an incident angle at which the display light 11 enters the inner glass 1202 is θ1. In the example shown in FIG. 10, since θ is different from θ1, a value of Δθ (θ−θ1) is not "0". For that reason, there are two optical paths each of which reaches the pupil 1205, and thus, a driver visually recognizes the display image 1204 and the ghost image 1203 so as to doubly overlap up and down.

FIG. 11 to FIG. 13 are views showing an outline of a configuration example of the head up display according to the second embodiment. As shown in FIG. 11 to FIG. 13, the head up display according to the second embodiment includes a display device 10, a polarization device 20, and an optical element 40 that is allowed to move in the vertical direction.

Display lights 11, 12 emitted by the display device 10 enter the polarization device 20. Then, the display lights 11, 12 that entered the polarization device 20 are reflected toward the optical element 40. Directions of the display lights 11, 12 that transmit the optical element 40 are changed, and they are emitted from the optical element 40. The display lights 11, 12 emitted from the optical element 40 enter the inner Glass 1202.

The optical element 40 causes the entering display lights 11, 12 to change their directions with different angles to emit them. For example, the optical element 40 is held by a holding member (not shown in the drawings) that is allowed to move in the vertical direction. By causing the holding member to move in the vertical direction by means of rotative power of a motor, the optical element 40 can move in the vertical direction in parallel.

In a case where the optical element 40 is caused to move downward in parallel from a state shown in FIG. 11 to a state shown in FIG. 12, a distance between the optical element 40 and the polarization device 20 becomes shorter. Compared with the state shown in FIG. 11 before caused to move downward in parallel, the display lights 11, 12 are emitted from a surface of the optical element 40 in a direction of the pupil 1205 of the driver in the state shown in FIG. 12. For that reason, compared with the state shown in FIG. 11 before caused to move downward in parallel, the display lights 11, 12 are reflected upward of the windshield 120 in the state shown in FIG. 12. Namely, compared with a state before caused to move downward in parallel, the display light 12 is reflected further upward of the inner glass 1202. Further, compared with the state before caused to move downward in parallel, the display light 11 is reflected further upward of the outer glass 1200.

On the other hand, in a case where the optical element 40 is caused to move upward in parallel from the state shown in FIG. 12 to a state shown in FIG. 13, the distance between the optical element 40 and the polarization device 20 becomes longer. Compared with the state shown in FIG. 12 before caused to move upward in parallel, the display lights 11, 12 are emitted from a surface of the optical element 40 in an opposite direction to the pupil 1205 of the driver in the state shown in FIG. 13. For this reason, compared with the state shown in FIG. 12 before caused to move upward in parallel, the display lights 11, 12 are reflected downward of the windshield 120 in the state shown in FIG. 13. On the other hand, compared with a state before caused to move upward in parallel, the display light 11 is reflected further downward of the outer glass 1200. This makes it possible to change a height of the pupil 1205 of the driver, and it becomes possible to display a display image such as a character and a symbol at an equivalent position for users each of whose height of a point of view is different from those of the other users.

Here, as shown in FIG. 11, it is possible to prevent a double image to be generated by inserting the optical element 40 so that a reflected light by the inner glass 1202 of the display light 12 overlaps a reflected light by the outer glass 1200 of the display light 11 and they enter the pupil 1205 of the driver.

FIG. 14 is a view showing an outline of a configuration example of the head up display according to the second embodiment. As shown in FIG. 14, the head up display includes a display device 10, an imaging unit 30, and an optical element 40.

The display device 10 includes an image display 100, a controller 200, and a storage 300. Further, the controller 200 includes a pupil position detector 210, a double image deviation amount calculator 230, and an optical element controller 240.

A pupil position coordinate that is a three-dimensional coordinate for specifying a position of the pupil 1205 and a height of the optical element 40 by which a double image is not generated (the height of the optical element 40 is a height from a road surface on which the vehicle drives to the optical element 40, for example) are stored in the storage 300 of the display device 10 so as to be associated with each other. Namely, the pupil position coordinate and a height of the optical element at which θ becomes equal to θ1 are stored in the display device 10 so as to be associated with each other.

The imaging unit 30 inputs image data of an image including the imaged pupil 1205 of the driver into the controller 200. The image data inputted into the controller 200 by the imaging unit 30 are inputted into the pupil position detector 210 of the controller 200.

The pupil position detector 210 of the controller 200 detects a position of a pupil by analyzing the image data, inputted from the imaging unit 30, of the image including the pupil of the driver. Further, the pupil position detector 210 calculates the pupil position coordinate for specifying the detected position of the pupil. The pupil position detector 210 then inputs the calculated pupil position coordinate (the three-dimensional coordinate for specifying the position of the pupil) into the optical element controller 240. In this regard, by analyzing the image data in place of detecting of the position of the pupil, the pupil position detector 210 may calculate the pupil position coordinate on the basis of a fitted position of the mirror (or the rearview mirror) of the vehicle (a three-dimensional coordinate for specifying a position to which the mirror is fitted), an angle of the mirror in the vertical direction by using a horizontal plane as a reference, and an angle of the mirror in the horizontal direction by using a vertical plane orthogonal to the mirror.

The optical element controller 240 of the controller 200 obtains the height of the optical element 40, which corresponds to the pupil position coordinate inputted from the pupil position detector 210 and by which the double image is not generated, from the storage 300.

The optical element controller 240 moves the optical element 40 so as to become the optical element 40 obtained from the storage 300. Thus, the optical element 40 is moved to the height at which the double image is not generated.

In this regard, the controller 200 is not necessarily included in the display device 10, and the head up display may include it separately from the display device 10.

Further, each of the three-dimensional coordinate for specifying the position of the pupil 1205 and the three-dimensional coordinate for specifying the position at which the mirror is fitted uses a center of the windshield 120 or a center of a handle as the origin of the coordinate axes, for example.

<Effects of Second Embodiment>

According to the head up display of the second embodiment explained above, the controller 200 moves the height of the optical element 40 to the position at which the double image is not generated on the basis of the pupil position information, whereby the double image is not generated, and this makes it possible to improve visibility of the display image 1204 projected by the display device 10.

As described above, the present invention made by the present inventors has been explained specifically on the basis of the embodiments. However, the present invention is not limited to the embodiments, and it goes without saying that the present invention may be modified into various forms without departing from the substance thereof. For example, the embodiments described above have been explained in detail for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment.

Moreover, a part of the configuration of each of the embodiments can be added to the other configuration, deleted or replaced thereby.

Further, a part or all of the configuration, the functions, the processors, processing means, and the like described above may be realized by hardware that is designed as an integrated circuit. Further, each of the configurations, the functions, and the like may be realized by software that is configured so that a processor interprets a program realizing each function and executes it. Information of the program, a table, a file and the like realizing each function can be placed or loaded on a memory, hard disk, a storage apparatus such as SSD (Solid State Drive), or a storage medium such as an IC card, a SD card, and a DVD.

REFERENCE SINGS LIST 10 display device,
20 polarization device,
30 imaging unit,
40 optical element,
100 image display,
200 controller,
210 pupil position detector,
220 font processor,
230 double image deviation amount calculator,
240 optical element controller, and
300 storage.

The invention claimed is:

1. A display device configured to project a display image including at least any one of a first image or a second image, a horizontal direction of the first image being longer than a vertical direction thereof, a vertical direction of the second image being longer than a horizontal direction thereof, the display device comprising:
   a controller configured to generate a display image obtained by changing a width of at least any one of the first image or the second image in accordance with a deviation amount between the display image and a ghost image, the ghost image being visually recognized so as to deviate in a deviation direction with respect to the display image; and
   an image display configured to emit a display light for projecting the display image generated by the controller.

2. The display device according to claim 1,
wherein, in a case where the deviation amount between the display image and the Ghost image does not exceed a width of the second image, the controller is configured to generate the display image by making the width of the second image thin by the deviation amount.

3. The display device according to claim 1,
wherein, in a case where the deviation amount between the display image and the ghost image does not exceed a width of the second image, the controller is configured to generate the display image by making a width of the first image thick by the deviation amount.

4. The display device according to claim 1,
wherein, in a case where the deviation amount between the display image and the ghost image does not exceed a width of the second image, the controller is configured to generate the display image by making the width of the second image thin and making a width of the first image thick.

5. The display device according to claim 1,
wherein, in a case where the deviation amount between the display image and the ghost image exceeds a width of the second image, the controller is configured to make a width of the second image and a width of the first image thick, and to make a length of the second image and a length of the first image long.

6. The display device according to claim 1,
wherein the controller is configured to generate a display image, obtained by changing luminance so as to reduce the luminance in a stepwise manner from a color of the display image toward the deviation direction, in an area of the display image by the deviation amount of the deviation direction side.

7. A display image projecting method for a display device configured to project a display image including at least any one of a first image or a second image, a horizontal direction of the first image being longer than a vertical direction thereof, a vertical direction of the second image being longer than a horizontal direction thereof, the display image projecting method comprising:
   a display image generating step in which a controller generates a display image obtained by changing a width of at least any one of the first image or the second image in accordance with a deviation amount between the display image and a ghost image, the ghost image being visually recognized so as to deviate in a deviation direction with respect to the display image; and
   a display light emitting step in which an image display emits a display light for projecting the display image generated by the controller.

8. A head up display comprising:
   a display device configured to emit a display light for projecting a display image;
   a polarization device configured to reflect the display light emitted by the display device;
   an optical element configured to emit the display light reflected by the polarization device toward a windshield of a vehicle;
   a pupil position detector configured to calculate pupil position information for specifying a position of a pupil of a driver; and
   a controller configured to move, on the basis of the pupil position information, a height of the optical element to a position at which a double image is not generated.

* * * * *